United States Patent
Rowe (10) Patent No.: US 9,346,676 B2
(45) Date of Patent: *May 24, 2016

(54) STABLE COMPLEXES OF ZERO-VALENT METALLIC ELEMENT AND HYDRIDE AS NOVEL REAGENTS

(71) Applicant: Toyota Motor Engineering & Manufacturing North America, Inc., Erlanger, KY (US)

(72) Inventor: Michael Paul Rowe, Pinckney, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 16 days.

This patent is subject to a terminal disclaimer.

(21) Appl. No.: 14/219,823

(22) Filed: Mar. 19, 2014

(65) Prior Publication Data

US 2015/0098882 A1    Apr. 9, 2015

Related U.S. Application Data

(63) Continuation-in-part of application No. 14/046,081, filed on Oct. 4, 2013, now Pat. No. 8,980,219.

(51) Int. Cl.
*C01B 6/24* (2006.01)

(52) U.S. Cl.
CPC ..................... *C01B 6/246* (2013.01)

(58) Field of Classification Search
CPC .................................................... C01B 6/246
USPC ...................... 423/644; 241/26, 27
See application file for complete search history.

(56) References Cited

U.S. PATENT DOCUMENTS

| 7,041,350 B1 | 5/2006 | Rule et al. |
| 2005/0217427 A1 | 10/2005 | Suthersan et al. |
| 2009/0264277 A1 | 10/2009 | Raj et al. |

FOREIGN PATENT DOCUMENTS

| JP | 2011122202 | 6/2011 |
| WO | 2012007830 A1 | 1/2012 |
| WO | WO 2012007830 A1 * | 1/2012 |

OTHER PUBLICATIONS

Schüth et al. "Light metal hydrides and complex hydrides for hydrogen storage", 2004, Chem. Commn., 2249-2258.*
Brenner et al. "The Synthesis and Nature of Heterogeneous Catalysts of Low-Valent Tungsten Supported on Alumina", 1980, Journal of Catalysis, 61, 216-222.*
Varin et al, "The effects of ball milling and nanometric nickel additive on the hydrogen desorption from lithium borohydride and manganese chloride (3LiBH4+MnCl2) mixture", Int. J. Hydrogen Energy, 35 (2010) 3588-3597.

(Continued)

*Primary Examiner* — Stanley Silverman
*Assistant Examiner* — Syed Iqbal
(74) *Attorney, Agent, or Firm* — Christopher G. Darrow; Darrow Mustafa PC (57) ABSTRACT

A composition and its method of production are provided. The composition includes at least one zero-valent metallic element atom in complex with at least one hydride molecule. The method of production includes ball-milling an elemental metal in a high-surface area form, with a hydride. The composition can be useful as a reagent for the synthesis of zero-valent metallic elemental nanoparticles.

22 Claims, 11 Drawing Sheets

(56) References Cited

OTHER PUBLICATIONS

Rowe et al., "Stable Complexes of Non-Metal Elements and Hydride as Novel Reagents". U.S. Appl. No. 14/046,081, filed Oct. 4, 2014.

Rowe, "Stable Complexes of Multiple Zero-Valent Metals and Hydride as Novel Reagents". U.S. Appl. No. 14/219,815, filed Mar. 19, 2014.

Rowe, "Stable Complexes of Zero-Valent Metallic Element and Hydride as Novel Reagents". U.S. Appl. No. 14/269,895, filed May 5, 2014.

Rowe et al., "Stable Complexes of Non-Metal Elements and Hydride as Novel Reagents". U.S. Appl. No. 14/269,909, filed May 5, 2014.

Chen et al., "Improved Dehydrogenation Properties of $Ca(BH_4)_2 \cdot nNH_3$ (n=1, 2, and 4) Combined with $Mg(BH_4)_2$,", Sep. 2012, J. Phys. Chem., 116, 21162-21168.

Imamura et al., "Dehydriding of $Sn/MgH_2$ nanocomposite formed by ball milling of $MgH_2$ with Sn", Jul. 2007, Int. J. Hydrogen Energy, 32, 4191-4194.

Schütch et al, "Light metal hydrides and complex hydrides for hydrogen storage", 2004, Chem. Commun., pp. 2249-2258.

Wronski et al., "A new nanonickel catalyst for hydrogen storage in solid-state magnesium hydrides", 2011, Int. J. Hydrogen Energy, 36, pp. 1159-1166.

\* cited by examiner

STABLE COMPLEXES OF ZERO-VALENT METALLIC ELEMENT AND HYDRIDE AS NOVEL REAGENTS

CROSS-REFERENCE TO RELATED APPLICATIONS

This application is a continuation-in-part of application Ser. No. 14/046,081, filed 4 Oct. 2013, and which is herein incorporated by reference in its entirety.

TECHNICAL FIELD

The present invention relates in general to a composition of matter composed of zero-valent metallic element in stable complex with one or more hydride molecules and in particular to zero-valent manganese or tin in complex with lithium borohydride, and also to a method for synthesizing the complex.

BACKGROUND

Hydrides, compounds in which metals or metalloids are bound directly to hydrogen, are relatively energetic molecules with a large variety of known and developing applications in chemistry and energy technology. Such applications include uses as reducing agents, hydrogenation catalysts, desiccants, potent bases, components in rechargeable batteries, and potentially as solid hydrogen storage vehicles in fuel cell technology.

Metal nanoparticles, particles of elemental metal in pure or alloyed form with a dimension less than 100 nm, have unique physical, chemical, electrical, magnetic, optical, and other properties in comparison to their corresponding bulk metals. As such they are in use or under development in fields such as chemistry, medicine, energy, and advanced electronics, among others.

Synthetic methods for metallic nanoparticles are typically characterized as being "top-down" or "bottom-up" and comprise a variety of chemical, physical, and even biological approaches. Top-down techniques involve the physical breakdown of macroscale metallic particles, using a variety of energy inputs, into nanoscale particles. Bottom-up methods involve the formation of nanoparticles from isolated atoms, molecules, or clusters.

Physical force methods for top-down metal nanoparticle synthesis have included milling of macroscale metal particles, laser ablation of macroscale metals, and spark erosion of macroscale metals. Chemical approaches to bottom-up synthesis commonly involve the reduction of metal salt to zero-valent metallic element with nucleation seed particles or self-nucleation and growth into metal nanoparticles.

While each of these methods can be effective in certain circumstances, each also has disadvantages or situational inapplicability. Direct milling methods can be limited in the size of particles obtainable (production of particles smaller than ~20 nm is often difficult) and can lead to loss of control of the stoichiometric ratios of alloys. Other physical methods can be expensive or otherwise unamenable to industrial scale. On the other hand, chemical reduction techniques can fail, for example in situations where metallic cations are resistant to chemical reduction. Mn(II) for example is virtually impervious to in situ chemical reduction, making this approach inapplicable to the preparation of $Mn^0$, or $Mn^0$-containing, nanoparticles.

SUMMARY

A composition of zero-valent metallic element in complex with hydride and a method of synthesizing the composition are provided.

In one aspect a reagent complex according to the following formula is disclosed:

$$E^0 \cdot X_y, \qquad \qquad I,$$

wherein $E^0$ is a zero-valent metallic element, X is a hydride, and y is an integral or fractional value greater than zero. In some variations, the zero-valent metallic element can be a transition metal, a post-transition metal, a lanthanide, or a metalloid, the hydride can be a complex metalloid hydride, and y can be four or less. In some instances, the zero-valent metallic element can be manganese, tin, tungsten, lanthanum, or germanium, the hydride can be lithium borohydride, and y can be one or two.

In another aspect a method for synthesizing a reagent complex is disclosed. The method includes mixing hydride with a preparation containing a zero-valent metallic element and ball-milling the mixture. In some variations, the zero-valent metallic element can be a transition metal, a post-transition metal, a lanthanide, or a metalloid, the hydride can be a complex metalloid hydride, and metallic hydride can be mixed with the preparation containing a zero-valent metallic element in a stoichiometric ratio of about 1:1 to 4:1, inclusive. In some instances, the preparation containing a zero-valent metallic element can be a preparation of manganese or tin; the hydride can be lithium borohydride; and the metallic hydride can be mixed with the preparation containing a zero-valent metallic element in a stoichiometric ratio of about 1:1 to 2:1, inclusive.

In another aspect a composition is provided, the composition including a reagent complex synthesized by a method comprising ball-milling a mixture of a hydride with a preparation containing a zero-valent metallic element.

BRIEF DESCRIPTION OF THE DRAWINGS

Various aspects and advantages of the invention will become apparent and more readily appreciated from the following description of the embodiments taken in conjunction with the accompanying drawings, of which.

DETAILED DESCRIPTION

Compositions of zero-valent metallic elements in complex with hydrides and methods of synthesizing the compositions are described. A zero-valent metallic element can alternatively be described as a metal which is in oxidation state zero or as an elemental metal.

As used here, the phrase "metallic element" refers to a metal, a lanthanide, or a metalloid. A "metal" can refer to an alkaline earth metal, an alkali metal, a transition metal, or a post-transition metal. The phrase "transition metal" can refer to any D-block metal of Groups 3 through 12. The phrase "post-transition metal" can refer to Group 13 through 16 metals. The term "metalloid" can refer to any of boron, silicon, germanium, arsenic, antimony, tellurium, or polonium.

As used here, a "hydride" can be a binary metal hydride (e.g. NaH, or MgH$_2$), a binary metalloid hydride (e.g. BH$_3$), a complex metal hydride (e.g. LiAlH$_4$), or a complex metalloid hydride (e.g. LiBH$_4$ or Li(CH$_3$CH$_2$)$_3$BH). In some examples the hydride will be LiBH$_4$. The term hydride as described above can in some variations include a corresponding deuteride or tritide.

A reagent complex is disclosed, comprising a complex according to Formula I:

wherein E$^0$ is a zero-valent metallic element, wherein X is a hydride, and wherein y is an integral or fractional value greater than zero.

In some particular variations, a reagent complex is disclosed, comprising a complex according to Formula II:

wherein M$^0$ is a zero-valent metal, wherein X is a hydride, and wherein y is an integral or fractional value greater than zero.

Uses of the reagent complex can include as a reactant in bottom-up synthesis of metal nanoparticles, either pure or alloyed. The reagent complex can be useful in producing, in different instances, metal nanoparticles composed of any of a variety of metals and of a variety of nanoparticulate sizes. In some instances the reagent complex can be useful in producing metal nanoparticles which are substantially free of metal oxides.

Referring now to Formula I, the zero-valent metallic element can be any zero-valent metallic element. In some aspects the zero-valent metallic element can be a zero-valent transition metal or a zero-valent post-transition metal. Suitable transition metals include, but are not limited to cadmium, cobalt, copper, chromium, iron, manganese, gold, silver, platinum, titanium, nickel, niobium, molybdenum, rhodium, palladium, scandium, tungsten, vanadium, and zinc. Suitable post-transition metals include aluminum, gallium, indium, tin, thallium, lead, or bismuth. In some instances the zero-valent metallic element can be manganese, tungsten, or tin.

In other aspects, the zero-valent metallic element can be a metalloid or a lanthanide. In some particular variations, the zero-valent metallic element can be germanium or lanthanum.

In various aspects, the hydride as incorporated in the reagent complex can be any hydride, including binary metal hydride, binary metalloid hydride, complex metal hydride, or complex metalloid hydride. In some variations, the hydride can be a complex metalloid hydride. In some instances, the hydride can be a borohydride. In some instances, the hydride can be lithium borohydride.

The reagent complex described by Formula I can be a complex of individual molecular entities, such as a single zero-valent metallic element atom complexed with one or more hydride molecules. Alternatively the reagent complex described by Formula I can exist as a discrete molecule, such as a zero-valent metallic element atom interacting with a salt hydride, a molecular cluster, such as a cluster of zero-valent metallic element atoms interspersed with hydride molecules, or a cluster of zero-valent metallic element, the cluster surface-coated with hydride molecules or the cluster interspersed with salt hydride molecules.

The value y according to Formula I can define the stoichiometry of hydride molecules to zero-valent metallic element atoms in the reagent complex. The value of y can include any integral or fractional value greater than zero. In some instances, y can be an integral or fractional value less than or equal to four. In some instances, y can be an integral or fractional value less than or equal to two. In some instances, y can be an integral or fractional value less than or equal to one.

A method for synthesizing a reagent includes the step of ball-milling a mixture of hydride with a preparation containing zero-valent metallic element. The resulting reagent, alternatively referred to herein as a reagent complex, comprises a complex according to Formula I:

wherein E$^0$ is at least one metal atom in oxidation state zero, derived from the preparation containing a zero-valent metallic element, wherein X is a hydride molecule, and wherein y is an integral or fractional value greater than zero.

In some particular variations, a method for synthesizing a reagent includes the step of ball-milling a mixture of hydride with a preparation containing zero-valent metallic element.

The resulting reagent, alternatively referred to herein as a reagent complex, comprises a complex according to Formula II:

$$M^0\text{-}X_y,\quad \text{II},$$

wherein $M^0$ is at least one metal atom in oxidation state zero, derived from a preparation containing a zero-valent metal, wherein X is a hydride molecule, and wherein y is an integral or fractional value greater than zero.

The preparation containing a zero-valent metallic element can be any composition consisting substantially of a zero-valent metallic element. In many instances the preparation containing a zero-valent metallic element will include zero-valent metallic element in a form which possesses a high surface-area-to-mass ratio. In some instances the zero-valent metallic element will be present in a powder form with a particulate size of −325 mesh. It is contemplated that the preparation containing a zero-valent metallic element can be a highly porous zero-valent metallic element, a zero-valent metallic element with a honeycomb structure, or some other preparation with a high surface-area-to-mass ratio.

In some instances the preparation containing a zero-valent metallic element can include a zero-valent transition metal. Suitable transition metals include, but are not limited to cadmium, cobalt, copper, chromium, iron, manganese, gold, silver, platinum, titanium, nickel, niobium, molybdenum, rhodium, palladium, scandium, vanadium, and zinc. In some instances the preparation containing a zero-valent metallic element can include a post-transition metal. Suitable post-transition metals include aluminum, gallium, indium, tin, thallium, lead, or bismuth.

It is to be understood that the zero-valent metallic element, be it transition metal, post-transition metal, alkali metal, or alkaline earth metal, will be in oxidation state zero. As used herein, "zero-valent" and "in oxidation state zero" are taken to mean that the material can exhibit a substantial but not necessarily complete zero oxidation state. For example, the preparation containing a zero-valent metallic element can include some surface impurities such as oxides.

It is contemplated that the phrase "high-surface-area-to-mass ratio" can encompass a broad range of surface-area-to-mass ratios and that, in general, the surface-area-to-mass ratio of the preparation containing a zero-valent metallic element employed will be that which is required by the time constraints of the method for synthesizing a reagent. In general, a higher surface-area-to-mass ratio of the preparation containing a zero-valent metallic element will lead to a more rapid completion of the method for synthesizing a reagent. In cases in which the preparation containing a zero-valent metallic element is composed of a powder of a zero-valent metallic element, smaller particle size of the powder of a zero-valent metallic element will lead to a more rapid completion of the method for synthesizing a reagent.

In some variations of the method for synthesizing a reagent, the hydride and the preparation containing a zero-valent metallic element can be present in a 1:1 stoichiometric ratio of hydride molecules to metal atoms contained in the preparation containing a zero-valent metallic element during the ball-milling step. In other variations the stoichiometric ratio can be 2:1, 3:1, 4:1 or higher. In some variations the stoichiometric ratio of hydride to elemental metal atoms in the preparation containing a zero-valent metallic element can also include fractional quantities, such as 2.5:1.

The reagent complex described by Formula I can be a complex of individual molecular entities, such as a single zero-valent metallic element atom complexed with one or more hydride molecules. Alternatively the reagent complex described by Formula I can exist as a molecular cluster, such as a cluster of zero-valent metallic element atoms interspersed with hydride molecules, or a cluster of zero-valent metallic element, the cluster surface-coated with hydride molecules or the cluster interspersed with salt hydride molecules.

The following paragraphs describe certain analytical approaches by which the method for synthesizing a reagent can by assessed and by which formation of a reagent complex according to Formula I can be determined. The approaches discussed do not present an exhaustive list of means by which performance of the method can be assessed or by which formation of a reagent complex according to Formula I can be determined.

Figure 1A:
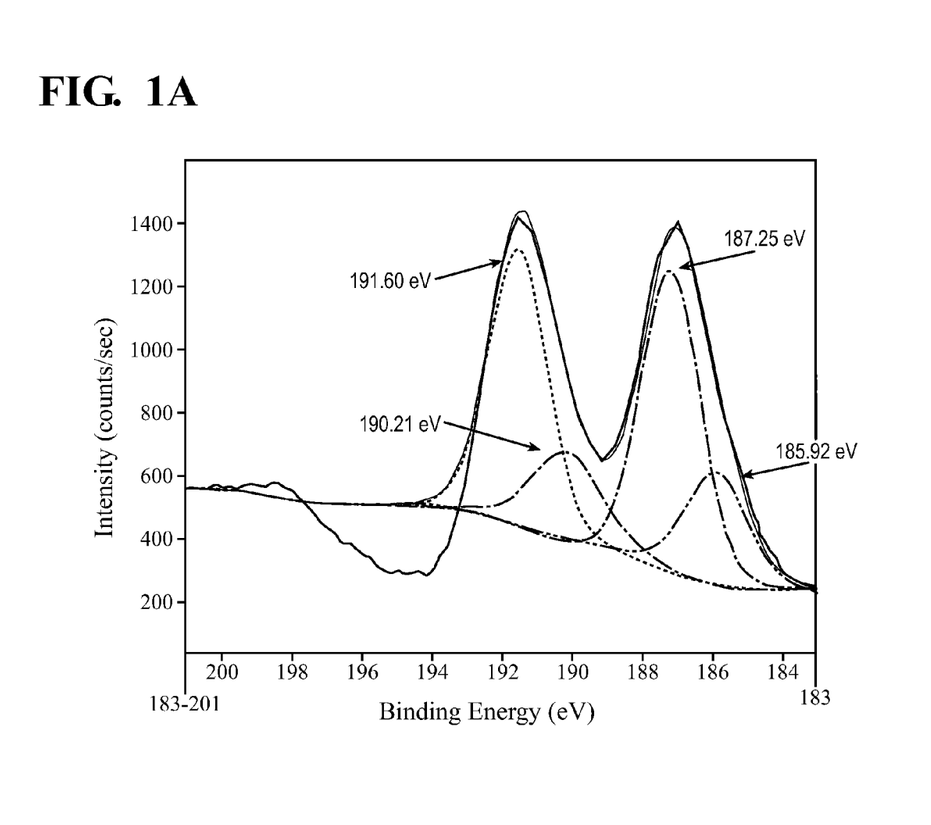
FIG. 1A is a boron x-ray photoelectron spectrum of a $LiBH_4$.
Figure 1B:
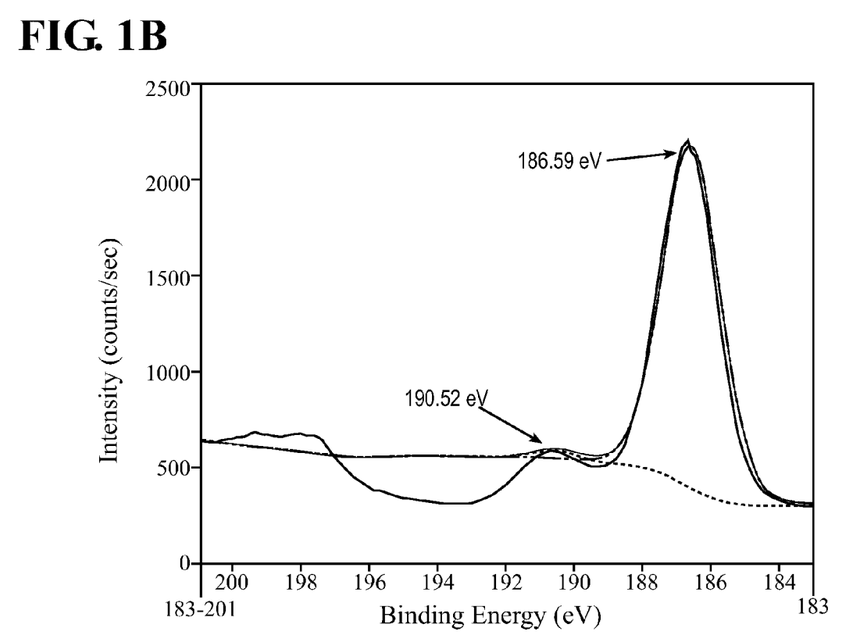
FIG. 1B is a boron x-ray photoelectron spectrum of a $Mn \cdot LiBH_4$ complex synthesized by a disclosed method for synthesizing a reagent complex.
Figure 1C:
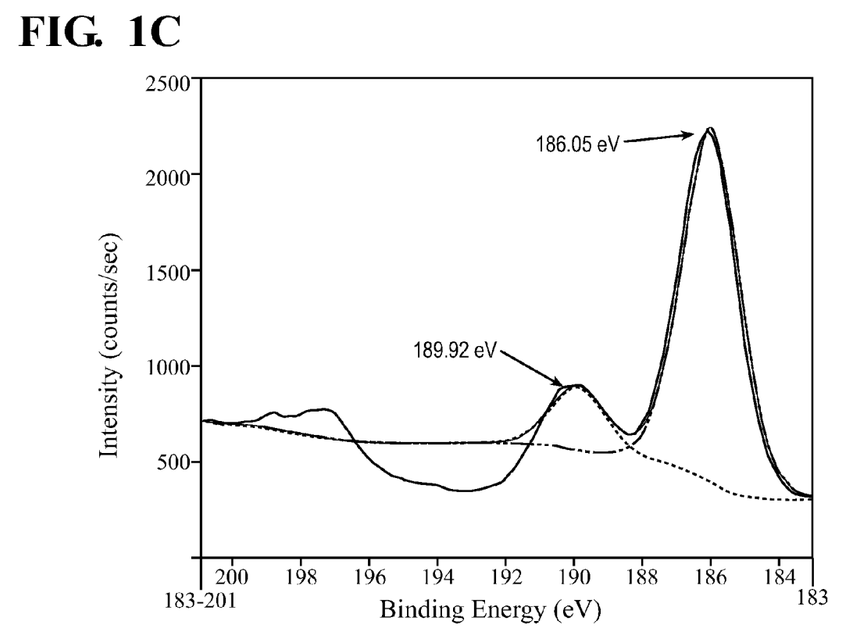
FIG. 1C is a boron x-ray photoelectron spectrum of a $Mn \cdot (LiBH_4)_2$ complex synthesized by the disclosed method for synthesizing a reagent complex.

FIGS. 1A, 1B, and 1C show x-ray photoelectron spectroscopy (XPS) scans in the boron region of uncomplexed hydride ($LiBH_4$) and of two reagent complexes containing $LiBH_4$ according to Formula I, where y is 1 and 2 in FIGS. 1B and 1C, respectively. Heavy solid lines show the raw XPS data while light solid lines show adjusted data. Dashed and/or dotted lines show deconvoluted individual peaks. The uncomplexed $LiBH_4$ of FIG. 1A shows two large peaks centered at 191.60 and 187.25 eV and two smaller peaks centered at 190.21 and 185.92 eV.

Comparing now FIG. 1B to FIG. 1A, ball-milling of the $LiBH_4$ with an equimolar quantity of a preparation containing zero-valent manganese virtually eliminates three of the boron peaks, with only a peak centered at 186.59 eV remaining. The change in boron XPS spectrum of the $LiBH_4$, resulting from ball-milling with the preparation of a zero-valent metallic element, can be taken as indicative of formation of a complex according to Formula I. As shown by comparison to FIG. 1C, ball-milling of $LiBH_4$ with a 2-fold molar excess of zero-valent manganese, instead of an equimolar quantity, leads to re-emergence of a boron peak centered at 189.92 eV. This could indicate that a portion of $LiBH_4$ is uncomplexed.

Figure 2A:
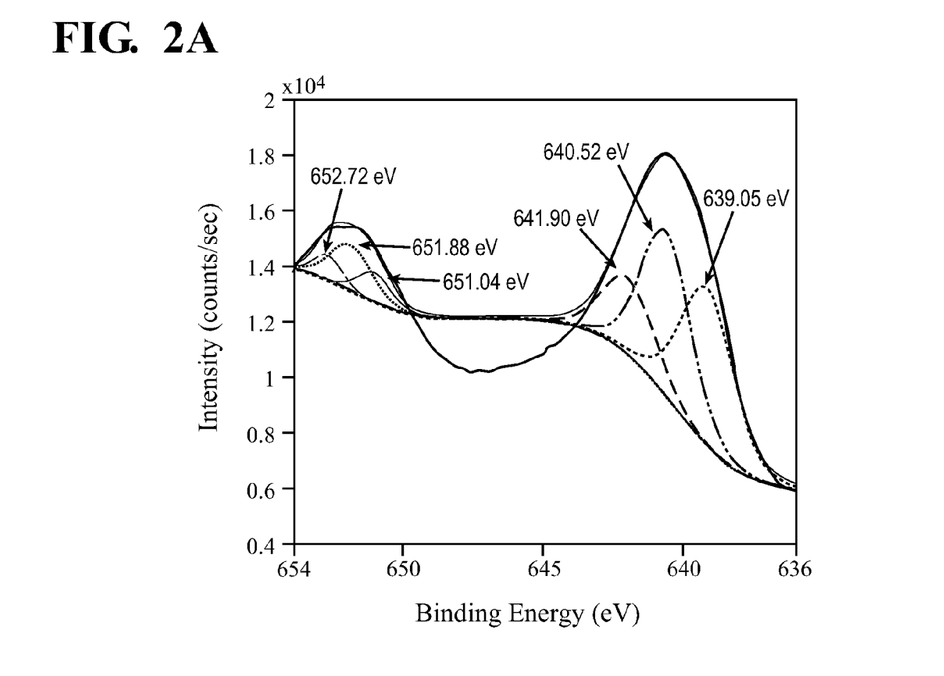
FIG. 2A is a manganese x-ray photoelectron spectrum of $Mn^0$ powder.
Figure 2B:
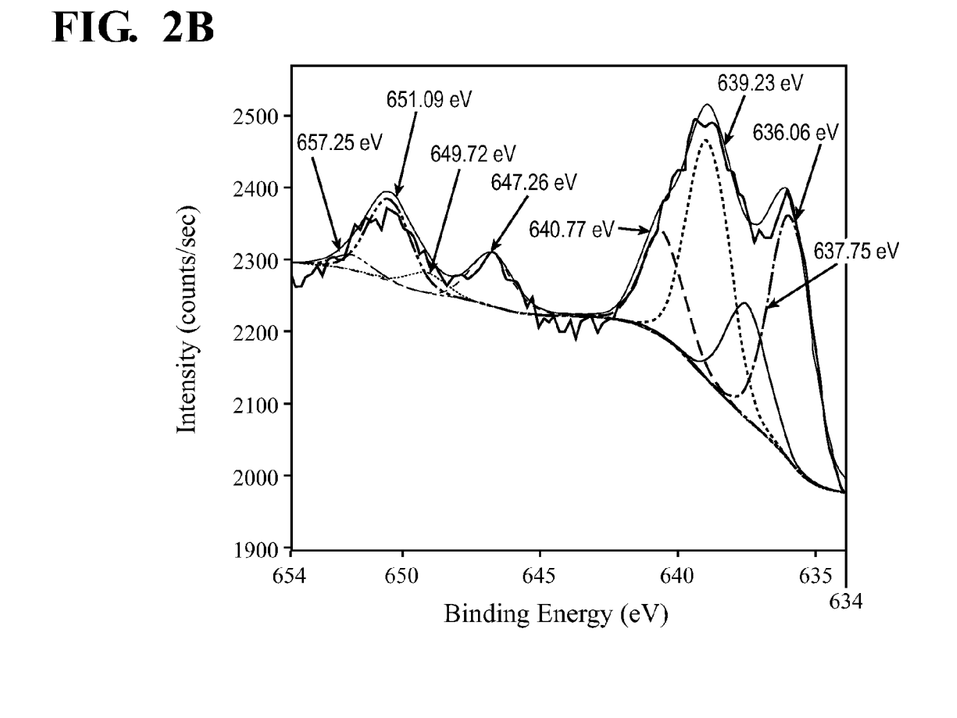
FIG. 2B is a manganese x-ray photoelectron spectrum of a $Mn \cdot (LiBH_4)_2$ complex synthesized by the disclosed method for synthesizing a reagent complex.
Figure 2C:
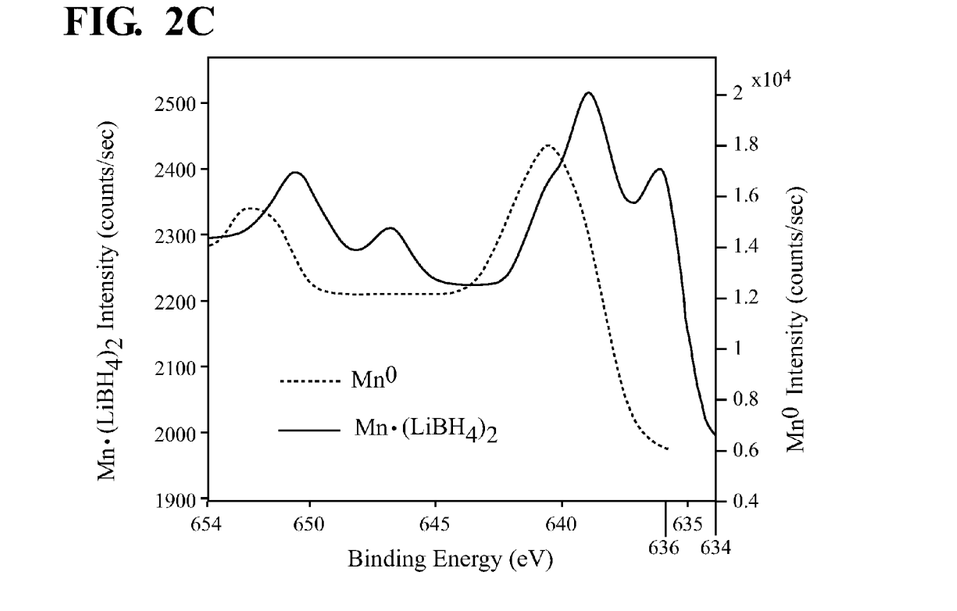
FIG. 2C is an overlay of the x-ray photoelectron spectrum of $Mn^0$ powder of FIG. 2A and the x-ray photoelectron spectrum of a $Mn \cdot (LiBH_4)_2$ complex of FIG. 2B.

FIG. 2A shows XPS scan of a preparation containing zero-valent manganese metal. FIG. 2B shows the XPS scan of a reagent complex as described by Formula I, containing the zero-valent manganese metal of FIG. 2A in complex with 2-fold molar excess of $LiBH_4$. Heavy solid lines again show the raw XPS data while light solid lines show adjusted data. Dashed and/or dotted lines show deconvoluted individual peaks. As seen in FIG. 2A, the spectrum of the preparation containing zero-valent manganese metal includes two broad peaks, each consisting of three component peaks observable after deconvolution. Referring now to FIG. 2A and focusing on the spectral region from ~639-642 eV, the three component peaks for the preparation containing zero-valent manganese metal can be assigned, based on published references, to manganese-oxide species (640.52 eV and 641.90 eV) and zero-valent manganese (639.05 eV). The ball-milled reagent complex represented in FIG. 2B has lost the oxide peak at 641.90 eV but retains the oxide peak at 640.52 eV (considered to be the same as the actual peak of FIG. 2B appearing at 640.77 eV after negligible shifting) and the zero-valent manganese peak at 639.05 eV (after negligible shifting). However a new phase is observed with component peaks at 637.75 eV and 636.06 eV. These latter two can be assigned to manganese in complex with the hydride. An overlay of the acquired manganese XPS data for manganese powder and ball-milled $Mn.(LiBH_4)_2$ reagent complex is shown in FIG. 2C. The comparison illustrates the loss of at least one oxide species, and the general shift toward lower electronic binding energies.

Figure 3A:
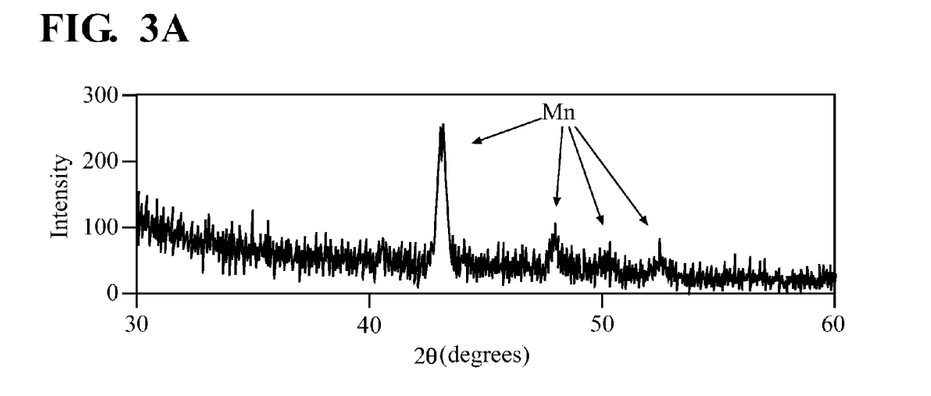
FIG. 3A is an x-ray powder diffraction scan of a $Mn \cdot LiBH_4$ complex synthesized by the disclosed method for synthesizing a reagent complex.
Figure 3B:
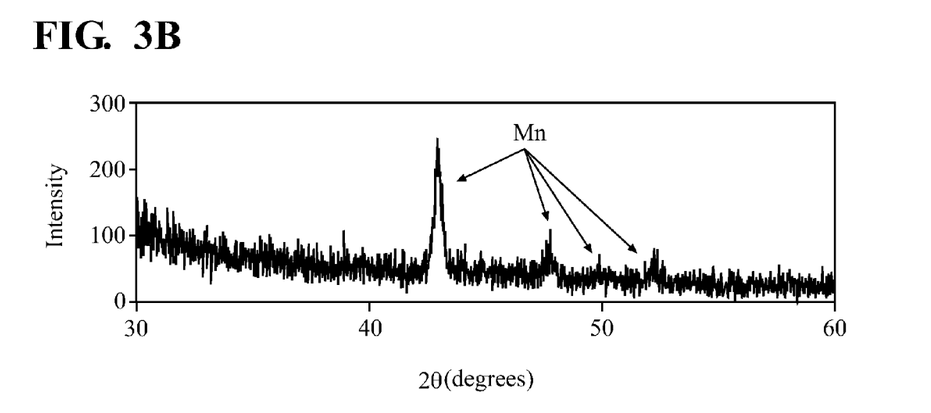
FIG. 3B is an x-ray powder diffraction scan of a $Mn \cdot (LiBH_4)_2$ complex synthesized by the disclosed method for synthesizing a reagent complex.

FIGS. 3A and 3B show XRD spectra of reagent complexes wherein a preparation containing zero-valent manganese metal was ball-milled with an equimolar amount or a two-fold molar excess of LiBH$_4$, respectively. Both diffraction analyses suggest the presence of manganese particles with an average maximum dimension of 20 nm. Neither diffraction analysis shows evidence of LiBH$_4$.

Figure 4:
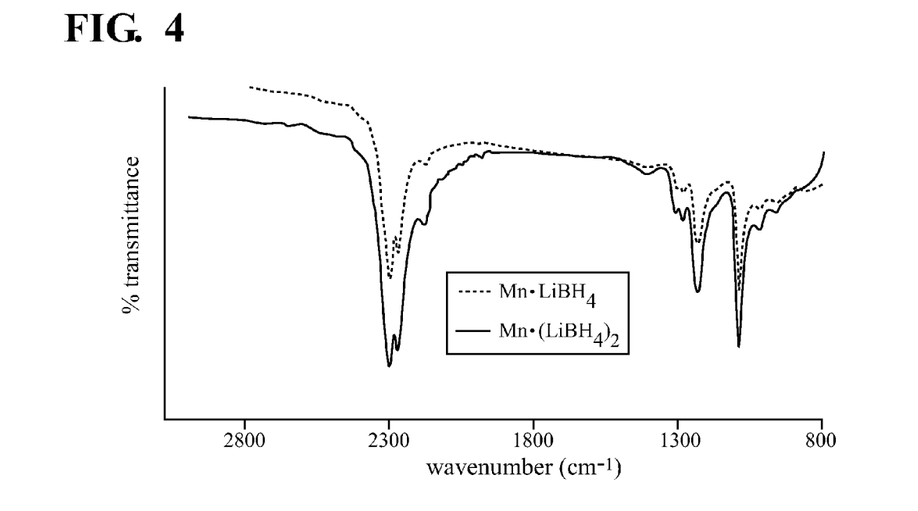
FIG. 4 is an overlay of an FT-IR spectrum of a Mn.LiBH$_4$ complex synthesized by the method of FIG. 1 and an Mn.(LiBH$_4$)$_2$ complex synthesized by the disclosed method for synthesizing a reagent complex.

An overlay of FT-IR scans for reagent complexes Mn.LiBH$_4$ and Mn.(LiBH$_4$)$_2$ is seen in FIG. 4. Both spectra have dominant features at 2299, 1230, and 1092 cm$^{-1}$ corresponding to IR-active modes of BH$_4^-$. While the results of FIGS. 1B and 1C strongly suggested that an electronic alteration of the boron had occurred, with respect to the state of boron in the authentic lithium borohydride, as a result of the ball-milling step of the method for synthesizing a reagent, the results in FIG. 4 indicate that the tetrahedral structure of the BH$_4^-$ is essentially unperturbed by the method. This result further suggests that the hydride retains its essential structure and activity in the complex of Formula I.

Figure 5A:
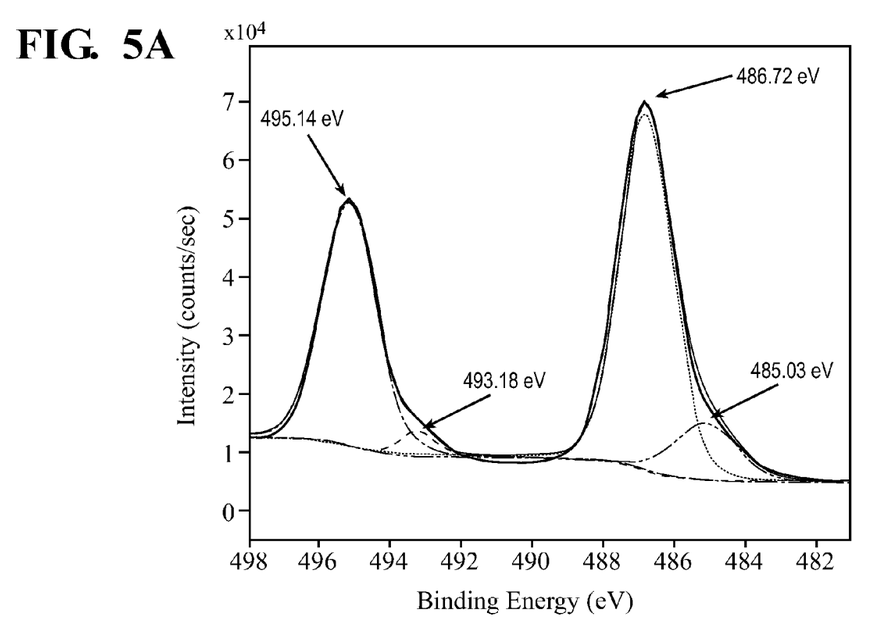
FIG. 5A is a tin x-ray photoelectron spectrum of Sn$^0$ powder.
Figure 5B:
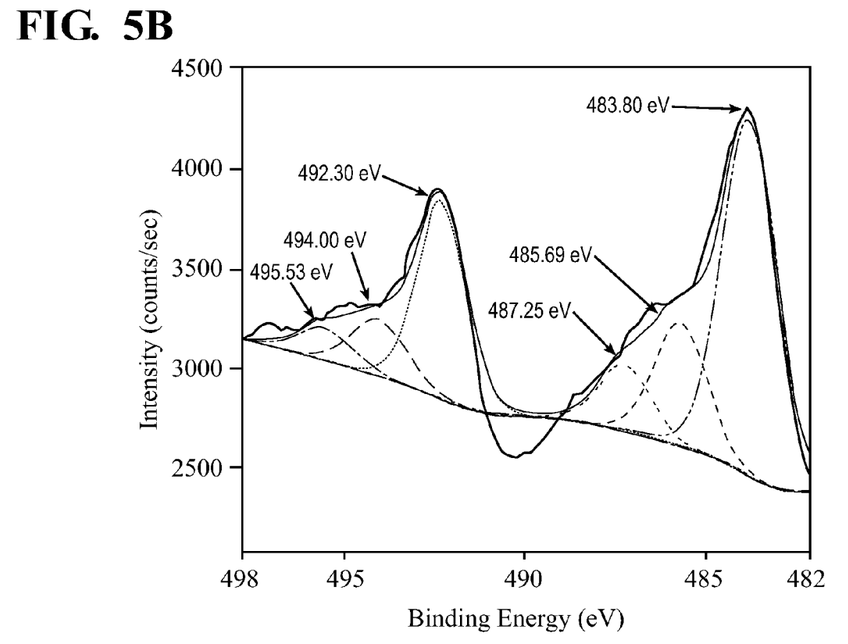
FIG. 5B is a tin x-ray photoelectron spectrum of an Sn.(LiBH$_4$)$_2$ complex synthesized by the disclosed method for synthesizing a reagent complex.

In FIG. 5A, an XPS scan is shown for a different preparation of a zero-valent metallic element; this preparation is of zero-valent tin metal. FIG. 5B shows the corresponding XPS scan of a reagent complex in which the zero-valent tin metal is in complex with a two-fold molar excess of hydride, LiBH$_4$. In FIGS. 5A and 5B, the heavy solid lines represent the raw XPS data while light solid lines show the adjusted data. Various dashed and/or dotted lines represent individual component peaks derived from peak deconvolution. Two major peaks at 495.14 and 486.72 eV and two minor peaks 493.18 and 485.03 eV in the preparation of zero-valent tin metal (FIG. 5A) shift substantially and/or disappear upon ball-milling with the hydride. In their places, the reagent complex Sn.(LiBH$_4$)$_2$ has major peaks at 492.30 and 483.80 eV with minor peaks at 495.53, 494.00, 487.25 and 485.69 eV (FIG. 5B).

Figure 5C:
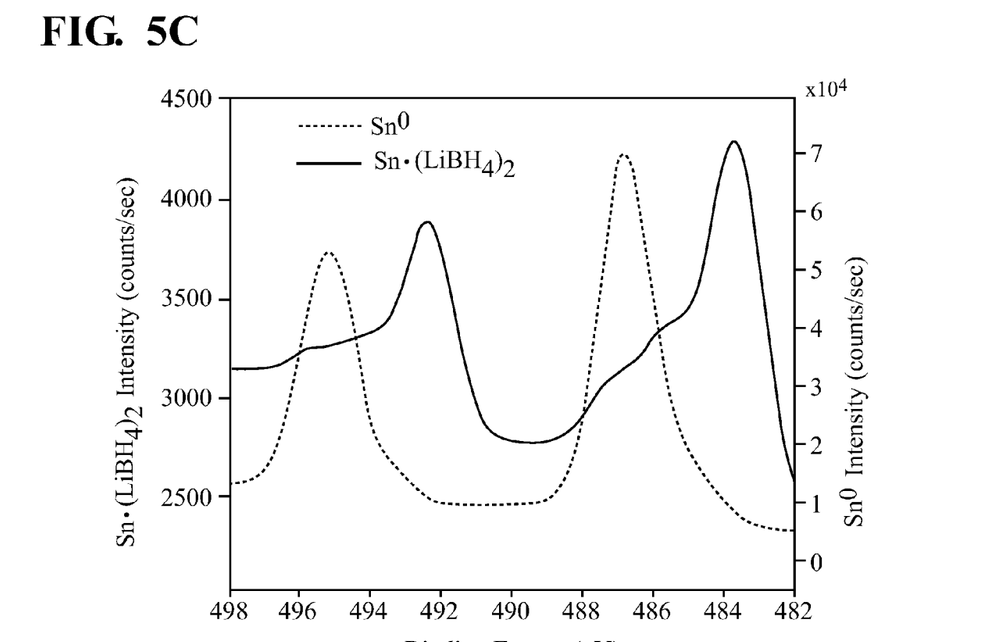
FIG. 5C is an overlay of the x-ray photoelectron spectrum of Sn$^0$ powder of FIG. 5A and the x-ray photoelectron spectrum of a Sn.(LiBH$_4$)$_2$ complex of FIG. 5B.

An overlay of the adjusted XPS data for the preparation containing zero-valent tin metal and the corresponding reagent complex comprising zero-valent tin and hydride, shown in FIG. 5C, also indicates the complexation of zero-valent tin with a hydride is accompanied by a spectral shift to lower electronic binding energies in the tin region XPS.

Figure 6A:
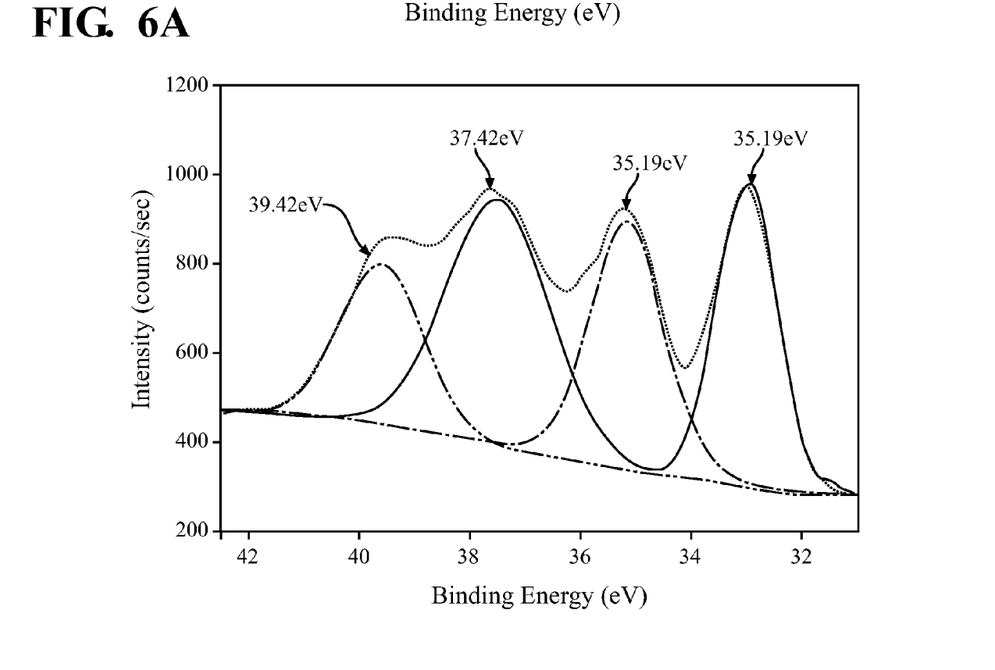
FIG. 6A is an x-ray photoelectron spectrum of W$^0$ powder.
Figure 6B:
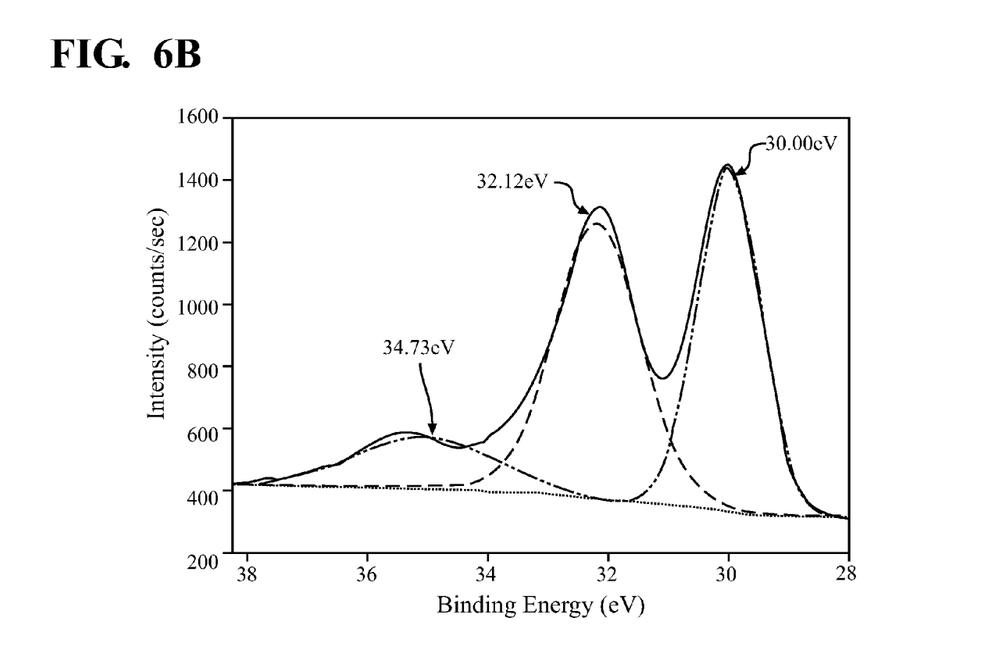
FIG. 6B is an x-ray photoelectron spectrum of a W.(LiBH$_4$)$_2$ complex synthesized by the disclosed method for synthesizing a reagent complex.
Figure 6C:
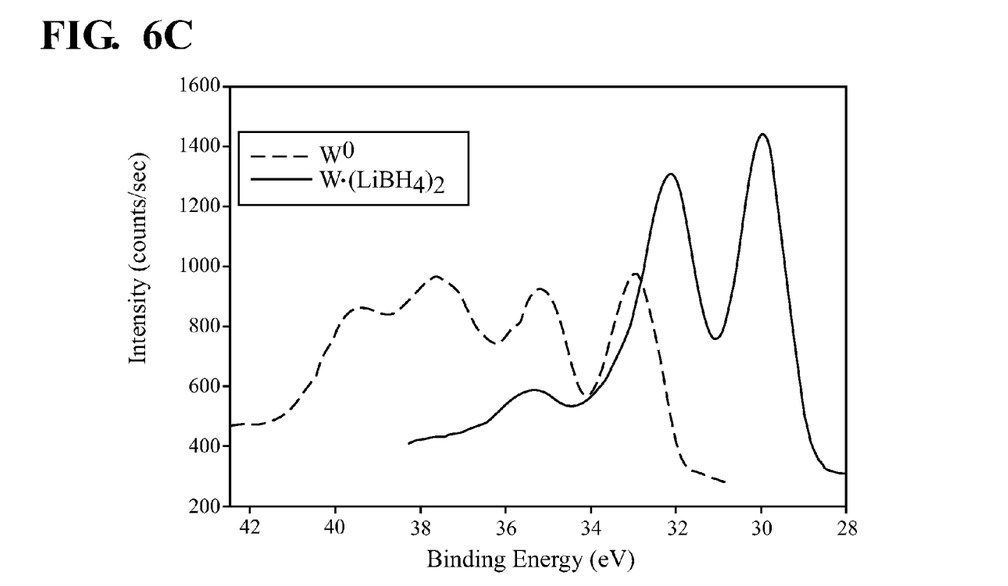
FIG. 6C is an overlay of the x-ray photoelectron spectrum of W$^0$ powder of FIG. 6A and the x-ray photoelectron spectrum of a W.(LiBH$_4$)$_2$ complex of FIG. 6B.

Referring now to FIGS. 6A and 6B, XPS spectra are shown for tungsten powder and for tungsten in complex with LiBH$_4$, respectively. The acquired spectrum is represented as a solid line while fitted component peaks are shown as various dashed and dotted lines. FIG. 6C shows the overlay of the W$^0$ and the W$^0$.(LiBH$_4$)$_2$ spectra. As the results of FIG. 6C make clear, complexation of W$^0$ with LiBH$_4$ is associated with a shift to lower binding energy of valence electrons of the metallic element, as was the case for Mn$^0$ and Sn$^0$, above.

Figure 7A:
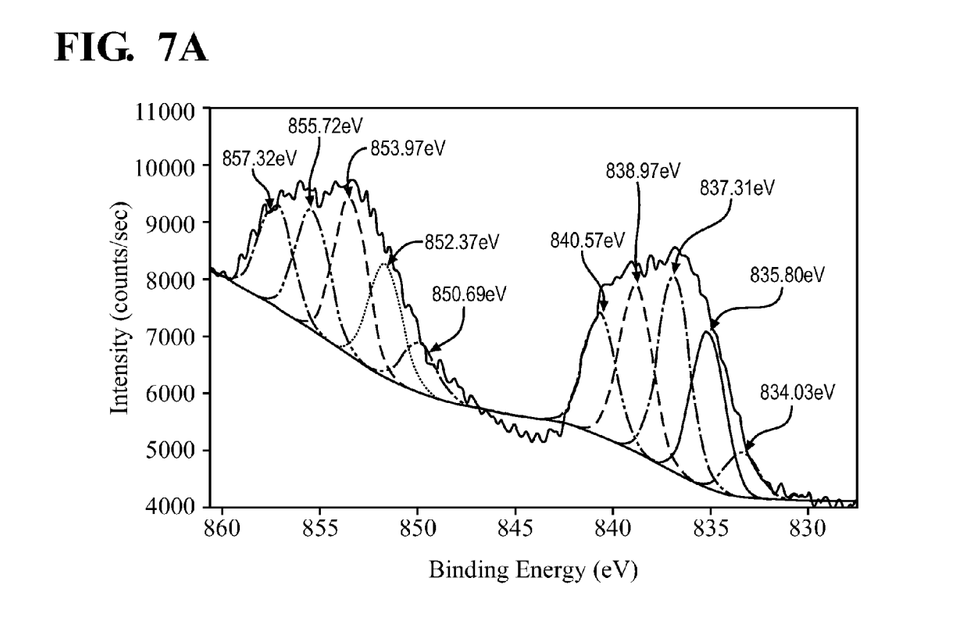
FIG. 7A is an x-ray photoelectron spectrum of La$^0$ powder.
Figure 7B:
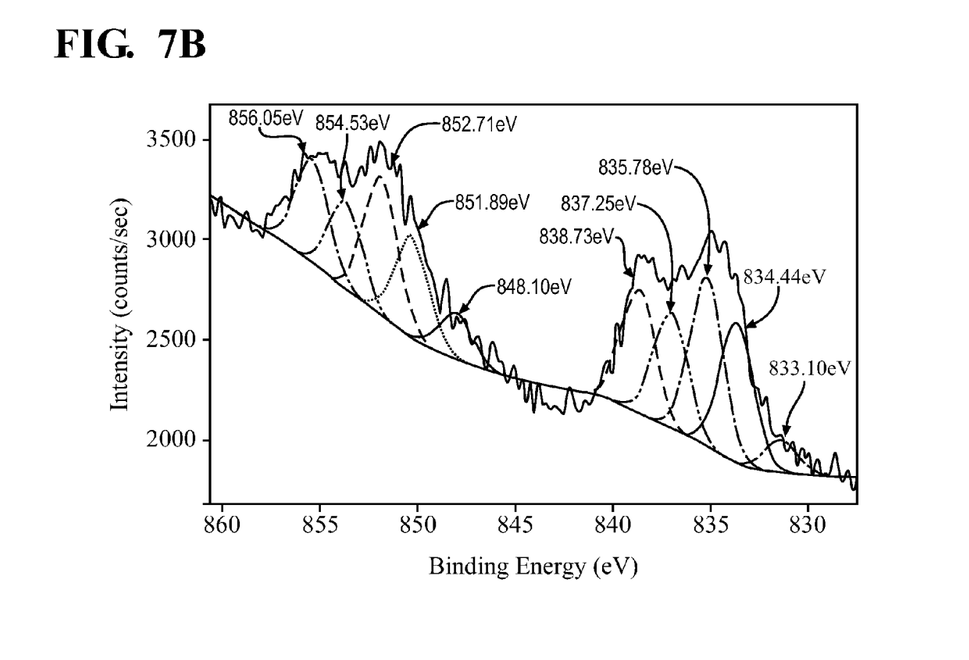
FIG. 7B is an x-ray photoelectron spectrum of a La.(LiBH$_4$)$_2$ complex synthesized by the disclosed method for synthesizing a reagent complex.
Figure 7C:
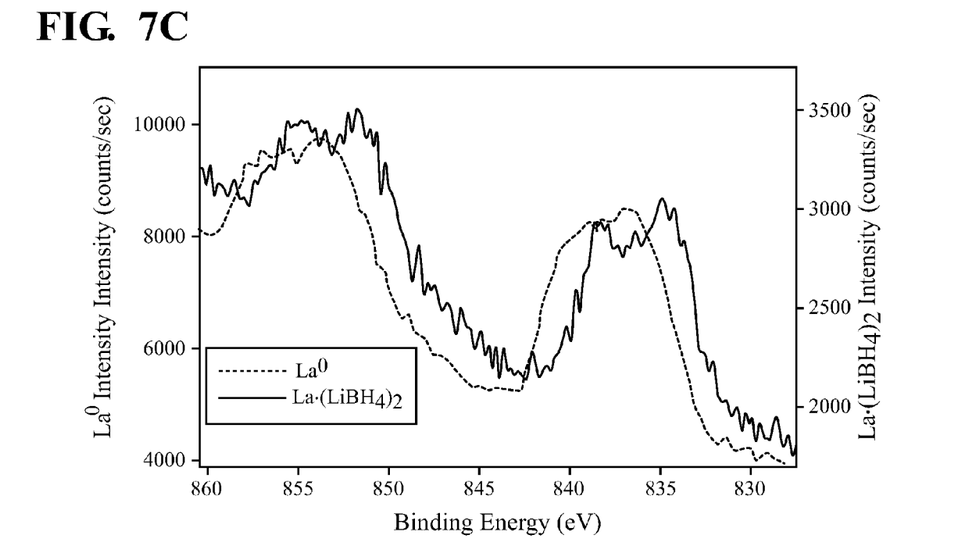
FIG. 7C is an overlay of the x-ray photoelectron spectrum of La$^0$ powder of FIG. 7A and the x-ray photoelectron spectrum of a La.(LiBH$_4$)$_2$ complex of FIG. 7B.

Referring now to FIGS. 7A and 7B, XPS spectra are shown for lanthanum powder and for lanthanum in complex with LiBH$_4$, respectively. Again, the acquired spectrum is shown as a solid line while fitted component peaks are represented by various dashed and dotted lines. FIG. 7C shows the overlay of the La$^0$ and the La$^0$.(LiBH$_4$)$_2$ spectra. The results of FIG. 7C show that the lanthanide as well, regardless of its relatively complex XPS spectrum, exhibits the characteristic general shift toward lower valence electron binding energies upon complexation with LiBH$_4$.

Figure 8A:
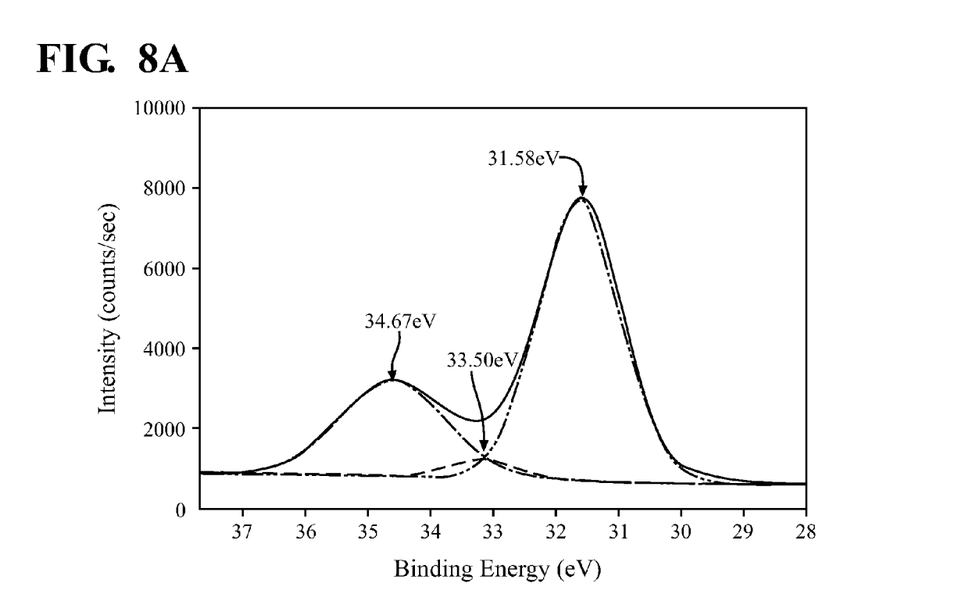
FIG. 8A is an x-ray photoelectron spectrum of Ge$^0$ powder.
Figure 8B:
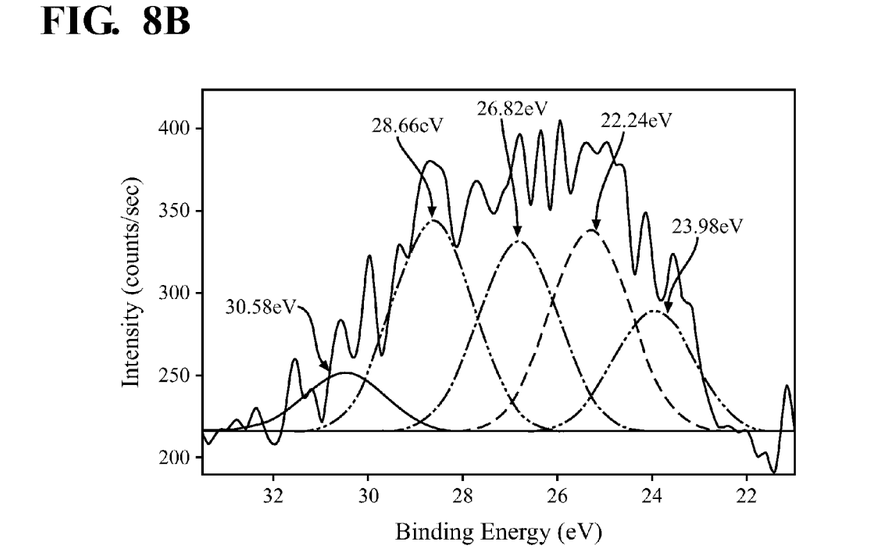
FIG. 8B is an x-ray photoelectron spectrum of a Ge.(LiBH$_4$)$_2$ complex synthesized by the disclosed method for synthesizing a reagent complex.
Figure 8C:
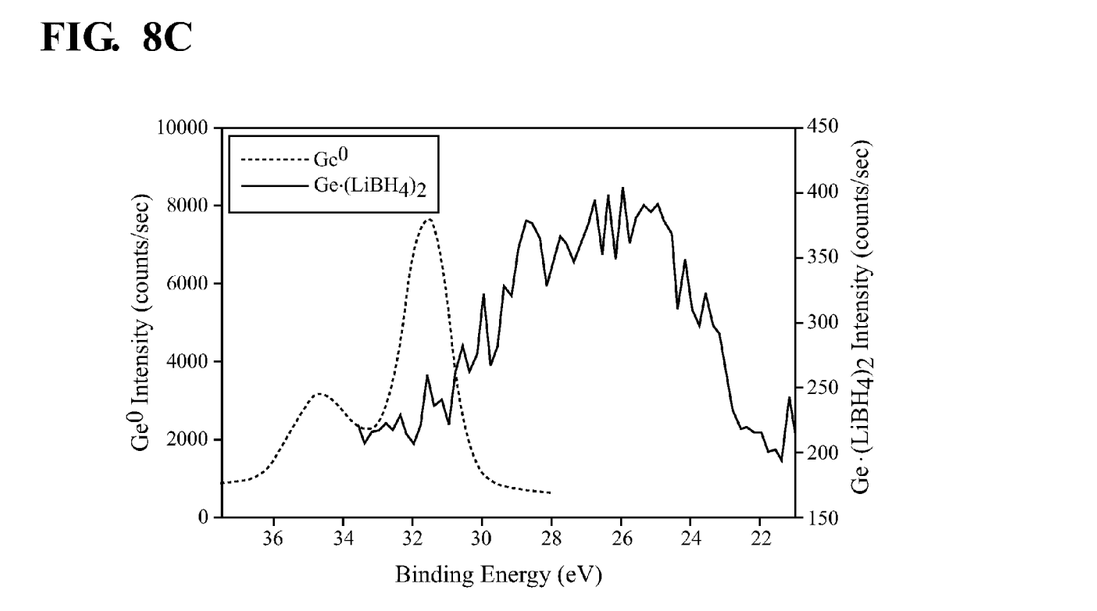
FIG. 8C is an overlay of the x-ray photoelectron spectrum of Ge$^0$ powder of FIG. 5A and the x-ray photoelectron spectrum of a Ge.(LiBH$_4$)$_2$ complex of FIG. 5B.

FIGS. 8A and 8B illustrate comparable XPS spectra for a representative metalloid, germanium. An XPS spectrum of the metalloid powder is shown in FIG. 8A while the spectrum of the metalloid in complex with LiBH$_4$ is shown in FIG. 8A. In both cases the acquired spectrum is shown as a solid line while fitted component peaks are shown as various dashed and dotted lines. An overlay of the acquired spectra is shown in FIG. 8C, again demonstrating a shift toward lower valence electron binding energies for germanium upon complexation of with LiBH4.

Also disclosed is a reagent complex as described above by Formula I:

$$E^0\text{-}X_y \qquad\qquad\qquad \text{I,}$$

wherein M$^0$ is a zero-valent metallic element, derived from the preparation containing a zero-valent metallic element, wherein X is a hydride, and wherein y is an integral or fractional value greater than zero and wherein the reagent is prepared by a method for synthesizing a reagent comprising the step of ball-milling a hydride with a preparation containing a zero-valent metallic element.

In some particular variations, the reagent complex prepared by the method comprises a complex according to Formula II:

$$M^0\text{-}X_y \qquad\qquad\qquad \text{II,}$$

wherein M$^0$ is at least one metal atom in oxidation state zero, derived from a preparation containing a zero-valent metal, wherein X is a hydride molecule, and wherein y is an integral or fractional value greater than zero.

The zero-valent metallic element can be any zero-valent metallic element. In some aspects the zero-valent metallic element can be a zero-valent transition metal or a zero-valent post-transition metal. Suitable transition metals include, but are not limited to cadmium, cobalt, copper, chromium, iron, manganese, gold, silver, platinum, titanium, nickel, niobium, molybdenum, rhodium, palladium, scandium, vanadium, and zinc. Suitable post-transition metals include aluminum, gallium, indium, tin, thallium, lead, or bismuth. In some instances the zero-valent metallic element can be manganese, tin, tungsten, lanthanum, or germanium.

In various aspects, the hydride as incorporated in the reagent complex can be any hydride, including binary metal hydride, binary metalloid hydride, complex metal hydride, or complex metalloid hydride. In some variations, the hydride can be a complex metalloid hydride. In some instances, the hydride can be a borohydride. In some instanced, the hydride can be lithium borohydride.

The reagent complex described by Formula I can be a complex of individual molecular entities, such as a single zero-valent metallic element atom in complex with one or more hydride molecules. Alternatively the reagent complex described by Formula I can exist as a molecular cluster, such as a cluster of zero-valent metallic element atoms interspersed with hydride molecules, or a cluster of zero-valent metallic element, the cluster surface-coated with hydride molecules or the cluster interspersed with salt hydride molecules.

The value y according to Formula I can define the stoichiometry of hydride molecules to zero-valent metallic element atoms in the reagent complex. The value of y can include any integral or fractional value greater than zero. In some instances, y can be an integral or fractional value less than or equal to four. In some instances, y can be an integral or fractional value less than or equal to two. In some instances, y can be an integral or fractional value less than or equal to one.

The preparation containing a zero-valent metallic element can be any composition consisting substantially of a zero-valent metallic element. In many instances the preparation containing a zero-valent metallic element will include zero-valent metallic element in a form which possesses a high surface-area-to-mass ratio. In some instances the zero-valent metallic element will be present in a powder form with a particulate size of −325 mesh. It is contemplated that the preparation containing a zero-valent metallic element can be a highly porous zero-valent metallic element, a zero-valent metallic element with a honeycomb structure, or some other preparation with a high surface-area-to-mass ratio.

The present invention is further illustrated with respect to the following examples. It needs to be understood that these examples are provided to illustrate specific embodiments of the present invention and should not be construed as limiting the scope of the present invention.

Example 1

One part manganese metal powder, of −325 mesh particle size, is mixed with one part or two parts $LiBH_4$, of total manganese metal and lithium borohydride powder mass of less than 10 grams, and ball-milled in a planetary ball-mill for 4 hours at 400 rpm (using a Fritsch pulverisette 7 planetary ball mill) in a 250 mL stainless steel airtight ball-mill jar with one ¾ inch, three ½ inch, and five ¼ inch 316 stainless steel ball bearings.

Example 2

One part tin metal powder, of −325 mesh particle size, is mixed with one part or two parts $LiBH_4$, of total tin metal and lithium borohydride powder mass of less than 10 grams, and ball-milled in a planetary ball-mill for 4 hours at 400 rpm (using a Fritsch pulverisette 7 planetary ball mill) in a 250 mL stainless steel airtight ball-mill jar with 1¾ inch, 3½ inch, and 5¼ inch 316 stainless steel ball bearings.

Example 3

Tungsten powder and lithium borohydride powder are added, in a 1:2 stoichiometric ratio, to a stainless steel ball mill under argon, with steel balls. This mixture is then milled in a planetary ball mill at 150 to 400 rpm (depending on hardness of metal) for 4 hours.

Example 4

Lanthanum powder and lithium borohydride powder are added, in a 1:2 stoichiometric ratio, to a stainless steel ball mill under argon, with steel balls. This mixture is then milled in a planetary ball mill at 150 to 400 rpm (depending on hardness of metal) for 4 hours.

Examples 5

Germanium powder and lithium borohydride powder are added, in a 1:2 stoichiometric ratio, to a stainless steel ball mill under argon, with steel balls. This mixture is then milled in a planetary ball mill at 150 to 400 rpm (depending on hardness of metal) for 4 hours.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A reagent complex according to a formula, $E^0.X_y$ wherein $E^0$ is a zero-valent metallic element having oxidation state zero; X is a hydride comprising at least one of a binary metalloid hydride, a complex metal hydride, and a complex metalloid hydride; and y is an integral or fractional value greater than zero.

2. The reagent complex of claim 1 wherein the zero-valent metallic element is at least one of a zero-valent transition metal, a zero-valent lanthanide, or a zero-valent metalloid.

3. The reagent complex of claim 1 wherein the zero-valent metallic element is tungsten, lanthanum, or germanium.

4. The reagent complex of claim 1 wherein the hydride comprises a borohydride.

5. The reagent complex of claim 1 wherein the hydride comprises lithium borohydride.

6. The reagent complex of claim 1 wherein y is about 4 or less.

7. A method for synthesizing a reagent complex, comprising:
ball-milling a mixture that includes:
a hydride comprising at least one of a binary metalloid hydride, a complex metal hydride, and a complex metalloid hydride; and
a preparation containing a zero-valent metallic element having oxidation state zero; and
producing a reagent complex according to a formula:

$E^0.X_y$ wherein $E^0$ is the zero-valent metallic element having oxidation state zero; X is the at least one of a binary metalloid hydride, a complex metal hydride, and a complex metalloid hydride; and y is an integral or fractional value greater than zero.

8. The method of claim 7 wherein the hydride comprises a borohydride.

9. The method of claim 7 wherein the hydride comprises lithium borohydride.

10. The method of claim 7 wherein the hydride and the preparation containing a zero-valent metallic element are mixed in substantially equimolar proportion.

11. The method of claim 7 wherein the hydride is mixed with the preparation containing a zero-valent metallic element in about four-fold or lower molar excess.

12. The method of claim 7 wherein the hydride is mixed with the preparation containing a zero-valent metallic element in about two-fold or lower molar excess.

13. The method of claim 7 wherein ball-milling is performed in a planetary ball mill for about 4 hours at about 400 rpm in a stainless steel airtight ball-mill jar with one ¾ inch, three ½ inch, and five ¼ inch 316 stainless steel ball bearings.

14. The method of claim 7 which is performed in an oxygen-free environment, in an anhydrous environment, or in an environment that is oxygen-free and anhydrous.

15. The method of claim 7 wherein the preparation containing a zero-valent metallic element is a preparation containing a transition metal, a preparation containing a post-transition metal, a preparation containing a lanthanide, or a preparation containing a metalloid.

16. The method of claim 15 wherein the preparation containing a zero-valent metallic element is a preparation containing tungsten, lanthanum, or germanium.

17. A reagent complex prepared by a method comprising:
ball-milling a mixture that includes:
a hydride comprising at least one of a binary metalloid hydride, a complex metal hydride, and a complex metalloid hydride; and
a preparation containing a zero-valent metallic element having oxidation state zero; and producing a reagent complex according to a formula:

$$E^0 . X_y$$

wherein $E^0$ is the zero-valent metallic element having oxidation state zero; X is the at least one of a binary metalloid hydride, a complex metal hydride, and a complex metalloid hydride; and y is an integral or fractional value greater than zero.

18. The reagent complex of claim 17 wherein the hydride comprises a borohydride.

19. The reagent complex of claim 17 wherein the hydride comprises lithium borohydride.

20. The reagent complex of claim 17 wherein the method is performed in an oxygen-free environment, in an anhydrous environment, or in an environment that is oxygen-free and anhydrous.

21. The reagent complex of claim 17 wherein the preparation containing a zero-valent metallic element is a preparation containing a transition-metal, a preparation containing a post-transition metal, a preparation containing a lanthanide, or a preparation containing a metalloid.

22. The reagent complex of claim 21 wherein the preparation containing a zero-valent metallic element is a preparation containing tungsten, lanthanum, or germanium.

* * * * *